(12) United States Patent
Shevenell et al.

(10) Patent No.: US 7,770,223 B2
(45) Date of Patent: Aug. 3, 2010

(54) METHOD AND APPARATUS FOR SECURITY MANAGEMENT VIA VICARIOUS NETWORK DEVICES

(75) Inventors: Michael P. Shevenell, Dover, NH (US); Lundy M. Lewis, Mason, NH (US); Richard W. Graham, Derry, NH (US)

(73) Assignee: Computer Associates Think, Inc., Islandia, NY (US)

(*) Notice: Subject to any disclaimer, the term of this patent is extended or adjusted under 35 U.S.C. 154(b) by 2821 days.

(21) Appl. No.: 10/122,637

(22) Filed: Apr. 12, 2002

(65) Prior Publication Data

US 2002/0184528 A1 Dec. 5, 2002

Related U.S. Application Data

(60) Provisional application No. 60/283,463, filed on Apr. 12, 2001.

(51) Int. Cl.
*G06F 11/00* (2006.01)
*G06F 12/14* (2006.01)
*G06F 12/16* (2006.01)
*G08B 23/00* (2006.01)

(52) U.S. Cl. .......................................... 726/23; 726/22
(58) Field of Classification Search .................. 725/23; 726/23

See application file for complete search history.

(56) References Cited

U.S. PATENT DOCUMENTS

| | | | |
|---|---|---|---|
| 5,906,696 A | | 5/1999 | Stillwell et al. |
| 5,907,696 A | * | 5/1999 | Stilwell et al. .............. 703/13 |
| 6,026,442 A | | 2/2000 | Lewis et al. |
| 6,519,703 B1 | * | 2/2003 | Joyce ........................ 726/22 |
| 6,687,833 B1 | * | 2/2004 | Osborne et al. ............. 726/23 |
| 6,768,975 B1 | * | 7/2004 | Gill et al. ................... 703/13 |
| 6,985,845 B1 | * | 1/2006 | Pisarsky ..................... 703/21 |
| 7,603,709 B2 | * | 10/2009 | Lewis et al. ................. 726/23 |

OTHER PUBLICATIONS

Cheswick, William R. and Bellovin, Steven M., "Traps, Lures, and Honey Pots", *Firewalls and Internet Security: Repelling the Wily Hacker*, 1994, pp. 133-142, Addison-Wesley, Reading, Massachusetts.
Cheswick, William R. and Bellovin, Steven M., "An Evening with Berferd", *Firewalls and Internet Security: Repelling the Wily Hacker*, 1994, pp. 167-179, Addison-Wesley, Reading, Massachusetts.
Clark, Tim, "Firm looks to lure hackers", http://news.com.com/2100-1001-2122733.html, Jun. 29, 1998, CNETNews.com.
Nist "Acquiring and Deploying Intrusion Detection Systems", ITL Bulletin, Nov. 1999, http://www.itl.nist.gov/lab/bulletins/nov99.htm.

* cited by examiner

*Primary Examiner*—Kambiz Zand
*Assistant Examiner*—Farid Homayounmehr
(74) *Attorney, Agent, or Firm*—Pillsbury Winthrop Shaw Pittman LLP

(57) ABSTRACT

In one embodiment of a method and apparatus for protecting data, voice, and video networks from individuals with malicious intent, a real network or network device has a vicarious simulated counterpart that may take the place of the real device or network upon appropriate triggering. The simulated counterpart behaves like the real device, but records the suspect transactions. The integrity of the real network or device is therefore continuously maintained because the suspect is isolated from the real network and the suspect transactions are not passed on to the actual device or network. The recorded transactions may then be analyzed for purposes of exposing the perpetrator, discovering perpetrator behavior patterns, and identifying device or network security weaknesses.

33 Claims, 8 Drawing Sheets

METHOD AND APPARATUS FOR SECURITY MANAGEMENT VIA VICARIOUS NETWORK DEVICES

RELATED APPLICATIONS

This application claims priority to U.S. Provisional Application Ser. No. 60/283,463, filed Apr. 12, 2001.

FIELD OF THE INVENTION

This invention relates to network security and, in particular, to management of network security through the application of network simulation techniques.

BACKGROUND

With the increasing dependence of nearly all aspects of modern life on network-based communications, network security has, of necessity, become of primary concern to businesses, individuals, and governments alike. Network operators are therefore scrambling to keep up with the latest network penetration and abuse techniques, trying to not only safeguard against them, but also to actively track and identify the perpetrators of such malicious acts. These are therefore the "hard" problems in security management, namely: (i) protection from network device hacking and (ii) identification of the perpetrator.

In many cases, when a network administrator becomes aware that a perpetrator is attacking a network device such as, for example, a router, the administrator protects the network against the malicious actions of the perpetrator by simply shutting down the device and then restarting it. While this solves the short-term problem of the current attack, it does nothing to prevent the perpetrator from later attacking the restarted device, possibly even by the previously utilized mechanism. It also, of course, allows the perpetrator to escape unidentified and unapprehended, presumably to attack this or another network in the future. In addition, the functioning of the network is disrupted, perhaps causing significant denial of service to legitimate users.

A somewhat more sophisticated approach is sometimes employed that provides the network administrator with a modicum of information about the perpetrator's method of attack, intentions, and identity. In this type of an approach, a probe or similar mechanism is attached to a transmission medium and is used to read packet headers. If a packet source or destination is deemed suspicious, then the administrator may investigate further by keeping a close watch on the intended destination of the packet. One serious drawback of this type of approach is that it leaves the network continuingly vulnerable to the actions of an attacker. By the time the administrator understands what the attacker is up to, it may be too late to prevent damage to the integrity of the network.

Another approach that has been tried requires the network administrator to first identify a suspected malicious individual and then isolate that individual in a "secure" area, such as a "jail" or "padded cell". The administrator then must simulate network responses by hand in an attempt to determine the individual's intentions. In one incident, described in detail in *Firewalls and Internet Security: Repelling the Wily Hacker*, William R. Cheswick and Steven M. Bellovin, Addison-Wesley, 1994, pp. 167-179, ("An Evening with Berferd"), the suspect was isolated in a network "jail" and then fed responses to his commands that were hand-entered as appropriate by the network administrator. The intent of the tools used in this case was not to simulate a system in real time, but rather to "watch the [suspect's] keystrokes, to trace him, learn his techniques, and warn his victims." They "lur[ed] him to a sacrificial machine" and then "tap[ped] the connection."

The limitations of this approach are self-evident: firstly, the network administrator's time is completely occupied with "playing network" for the entertainment of the suspect, to the detriment of any other tasks that need to be accomplished, and secondly, the suspect must be rather gullible in order to accept the serious delays incurred while the administrator formulates, inputs, and sends "safe" responses. A particular difficulty the administrator encountered in this case was making sure that the responses given were consistent, especially as many of the decisions about how the simulated system would act were of necessity made on the fly. The authors themselves admit that this approach had several inherent dangers, including that a more perceptive suspect might have fled quickly, or perhaps even escaped the jail and caused serious damage to the network. This approach also only works for those production-type network devices that provide responses that are capable of simulation by a human administrator.

Another security approach that has been utilized is use of a "honey pot." A honey pot is an essentially sacrificial device that is set up as part of a network. The honey pot is specifically designed to entice individuals with malicious intent into invading it and then displaying that malicious intent. The honey pot emulates a production server while alerting administrators to, and permitting logging of, the activities of any intruders. The honey pot's main goal is to attract intruders away from the real servers. In order to work, the honey pot therefore usually needs to be positioned close to production servers and needs to be in some way more attractive than they are. The honey pot does not actually substitute for any of the production servers, but is rather merely a decoy that is intended to distract a malicious individual away from real servers, at least long enough for the individual's techniques to be observed and, ideally, for the individual to be caught.

The drawbacks of this approach are several. For one, there is no guarantee that a malicious individual will even notice the honey pot, much less allow it to be a distraction from the individual's original intended target. The remainder of the network remains completely vulnerable to anyone who does not notice the honey pot or chooses not to take the bait. Further, a honey pot is obviously useless in actually defending against an attack that is directed against another device or transmission medium in the network. The honey pot only works if it can lure away the malicious individual; if it fails to do so, the network is completely undefended. While honey pots work on the concept that all traffic to a honey pot is deemed suspicious, if the malicious traffic is to another device, then the presence of a honey pot will do nothing at all to protect the integrity of the network.

Existing commercial honey pots also are somewhat limited in their ability to effectively emulate the various types of network devices or media. They generally run on production equipment and do not provide a full simulation of non-production services. The emulation software must therefore know about a particular vulnerability prior to its exploitation in order for it to be emulated properly. If the vulnerability is new or unknown, it is highly likely that the emulation will fail and the honey pot will be revealed. The alternative to emulation is very time- and resource-intensive: full-blown, dedicated systems of each type that serve no purpose other than to act as an intruder jail and observation area. Few networks can afford to have the resulting plethora of separate dedicated systems that would be needed in order to have the ability to replace every device and transmission medium on the network.

What has been needed, therefore, is a way to secure the integrity of an entire communications network from the malicious actions of a perpetrator, while still enabling automatic responses to, and recording of, those actions. This will in turn allow for further analysis that will ideally lead to (i) identification of the mechanism by which the perpetrator has attacked the network, in order that that avenue of attack can be eliminated from use by future attackers, and (ii) identification and apprehension of that particular perpetrator.

OBJECTS OF THE INVENTION

Accordingly, an object of the present invention is to provide a method and apparatus by which to protect the integrity of data, voice, and video networks and devices.

A particular object of the present invention is to reduce the long-term threat to any particular communications network from the actions of a specific malicious individual.

A further particular object of the present invention is to provide network administrators with assistance in identifying malicious individuals and their behavior patterns.

Yet another particular object of the present invention is to provide a way for network device simulators to react quickly and consistently enough that an individual interacting with them would have no reason to suspect that they are interacting with a simulated device instead of a real device.

SUMMARY

The present invention is a method and apparatus for protecting data, voice, and video networks from individuals with malicious intent. In one embodiment, a real network or network device has a simulated counterpart that may take the place of the real device upon appropriate triggering. The simulated counterpart behaves like the real network or device, but records suspect transactions in a file. The file may then be analyzed in order to expose the perpetrator, discover behavior patterns, and identify security weaknesses of the network or device. The integrity of the real network or device is protected because the suspect is isolated from the real network and the suspect's transactions are not passed on to the actual device or network.

In a preferred embodiment of the present invention, the current device in effect may be either the simulated (vicarious) device or the real device. The control agent determines which device is in effect. The role of the control agent is to monitor the network usage and the various activities being initiated by individuals admitted to interaction with the real device. If the device in effect is the simulated device, then transactional data is recorded in the perpetrator file, whereupon an analysis agent may study the file for clues regarding the identity of the perpetrator, the motives of the perpetrator, and/or common behavior patterns that may be used to suspect future perpetrators.

While the simulated device is in effect, normal traffic input may be (i) discarded altogether, (ii) wholly or selectively saved in a database and re-sent when the real device comes back on line, or (iii) re-sent by upstream devices when the real device is receptive to normal input. Alternatively, normal traffic may be allowed to continue to reach the real device in the usual manner, while only the suspect individual's traffic is redirected to the simulated device.

In one embodiment of a simulator suitable for use as a vicarious device or network in an embodiment of the present invention, a device dataset contains a plurality of counter variables having instance values that change over time and describe the behavior of the device on the network. A characterization file is created from the device dataset based on correlations among the variables and their instance values. The characterization file is then used to generate predicted instance values for a simulated device.

If desired, a performance improvement may be obtained in this embodiment by reducing the size of the characterization file by removing the variables in the file that haven't been touched or used. To do this, first a full simulation of the device or network is created. The simulated device or network is then run under actual operating conditions and asked to perform the tasks it will likely be expected to perform when under attack. The simulator's activity under these conditions is logged to a file, which is then used to identify those attributes that are actually used in the performance of the required tasks. Unused attributes are then deleted from the simulator dataset, and a new simulator is created utilizing only the reduced dataset.

An embodiment of the present invention solves a potential difficulty that the simulator may lack "realness" in its responses by having the simulator query the actual networking device for exact values, thereby permitting a more reliable portrayal of the device. The simulator then may blend the real device data and responses with simulated data and responses. Depending on the nature of the attack, an alternate embodiment allows the simulator to send commands back to the actual device. These action commands may come to the real device directly from the simulator or may come from a "trusted" management station/device that receives output from the simulator.

If the period while the vicarious device is substituted for the actual network device is reasonably small, traffic received while the vicarious device is in effect may be preserved through buffering. It is generally desirable to do this, not only to prevent loss of data for non-attackers, but also to prevent the attacker from detecting the simulation. Traffic continues to be buffered until the suspicious traffic and activities have halted, at which time the buffered traffic is sent to the real network device.

While replacing the network device that is under attack with a simulated copy lets event monitoring take place without the intruder interfering with normal network operation, there is a possibility that, by taking the actual device offline, there may be complete denial of service to ordinary users while the simulated device is operational. The present invention therefore contemplates alternate constructions that avoid a potential denial of service problem. In one such alternate embodiment, a mechanism may be added to existing network devices in order to redirect only specific messages or categories of messages to a simulator. This allows provision of responses without taking the primary forwarding device offline.

DETAILED DESCRIPTION

In one embodiment of a method and apparatus for protecting data, voice, and video networks from individuals with malicious intent, a real network or device that resides on a network has a simulated (vicarious) counterpart that may take the place of the real device upon appropriate triggering. The simulated counterpart behaves like the real device or network, but records suspect transactions in a perpetrator file. The file may then be analyzed for purposes of exposing the perpetrator, discovering behavior patterns, and identifying security weaknesses of the network or device. The integrity of the real network or device is protected because the suspect is isolated from the real network and the suspect's transactions are not passed on to the actual device or network.

As previously discussed, the "hard" problems in security management are (i) protection from network device hacking and (ii) identification of the perpetrator. The present invention solves this problem by substituting a vicarious device (i.e. a simulated device) in place of the real device, whereupon the transactions of the hacker are logged into a database for further analysis. Particular advantages of the present invention are that: (i) the perpetrator unknowingly hacks a simulated device rather than harming the real device, (ii) the perpetrator is not "spooked" by any suspicion of being monitored, (iii) the perpetrator's specific transactions are recorded for later analysis, leading to an understanding of the network security weakness exploited by the perpetrator and, potentially, to identification and apprehension of the perpetrator, and (iv) the integrity of the network is not compromised.

Figure 1:
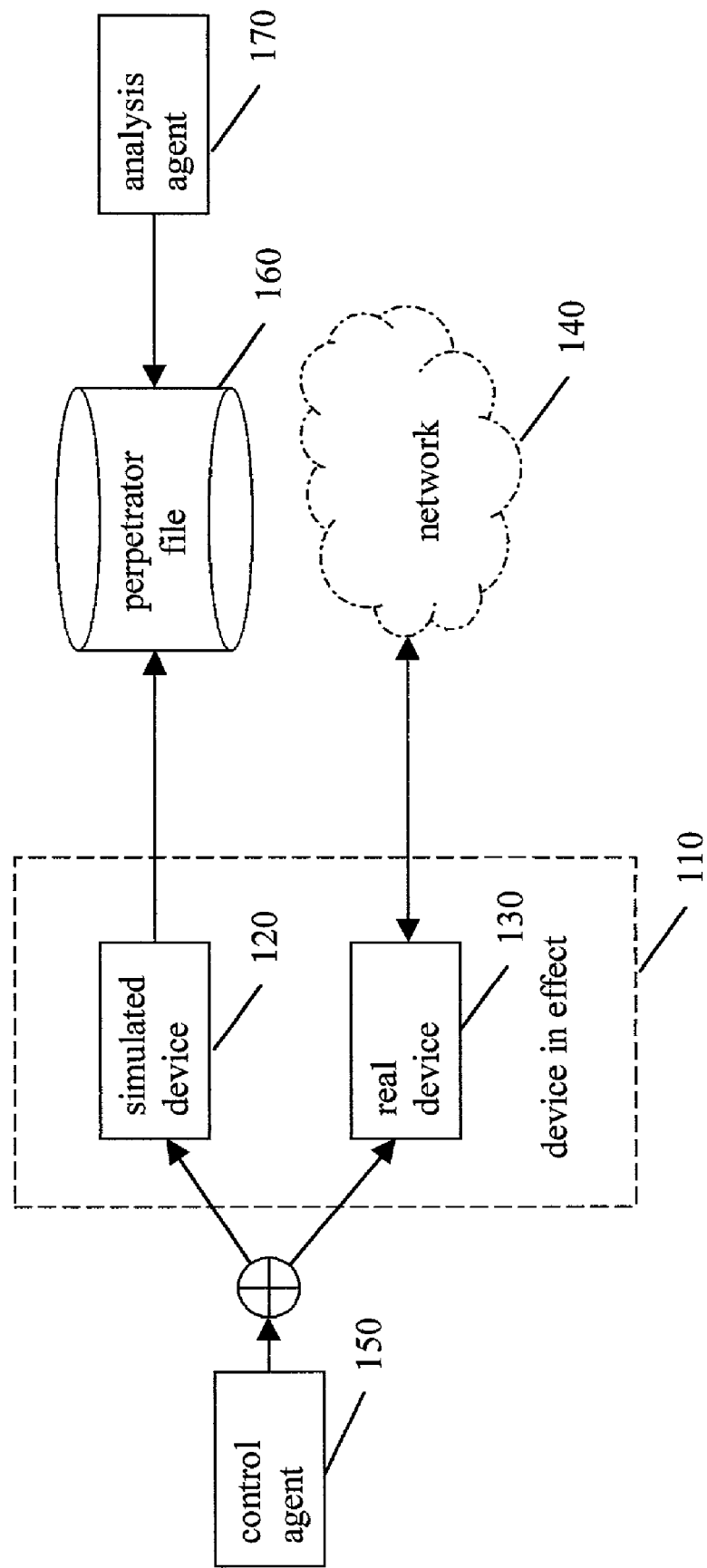
FIG. 1 is a block diagram of an example implementation of an apparatus for security management using vicarious network devices according to the present invention.

An embodiment of the invention is shown in FIG. 1. The current device in effect 110 may be either the simulated device 120 or the real device 130. The default is the real device 130, which interacts in the normal manner with the rest of the network 140. The real device 130 or network may be any device or network that is capable of emulation by a simulated device, including, but not limited to, a transmission device, a computer system (e.g. an end station), or any transmission medium (e.g. Ethernet network or ATM switch fabric).

The control agent 150 determines which device is in effect. The control agent 150 may be of any form known in the art, including, but not limited to, a human administrator, a rule-based expert system, a probe-based system, a "network sniffer," or any other system capable of detecting potential malicious activity. The role of the control agent 150 is to monitor the network traffic and the various activities being initiated by individuals admitted to interaction with the real device 130. The detection of attacks can be made by any of the many methods known in the art including, but not limited to, use of a traffic monitor that employs specific heuristics by which to detect a possible attack. Detection of an attack by the control agent 150 triggers substitution of the simulated device 120 for the real device 130 as the device in effect 110. The trigger function may be part of the function of the control agent 150, or may alternatively be part of a separate device that receives instructions from the control agent 150.

If the device in effect 110 is the simulated device 120, then transactional data is optionally recorded in the optional perpetrator file 160, whereupon an optional analysis agent 170 may study the file for clues regarding the identity of the perpetrator, the motives of the perpetrator, common behavior patterns that may be used to suspect future perpetrators, and/or specific security weaknesses of the real device or network 130. The analysis agent may utilize any of the many analysis methods known in the art, including, but not limited to, standard statistical methods, neural networks, and genetic algorithms.

While the simulated device is in effect, normal traffic input may be (i) discarded altogether, (ii) wholly or selectively saved in a database and re-sent when the real device comes back on line, or (iii) re-sent by upstream devices when the real device is receptive to normal input. Alternatively, normal traffic may be allowed to continue to reach the real device in the usual manner, while only the suspect individual's traffic is redirected to the simulated device.

Figure 2:
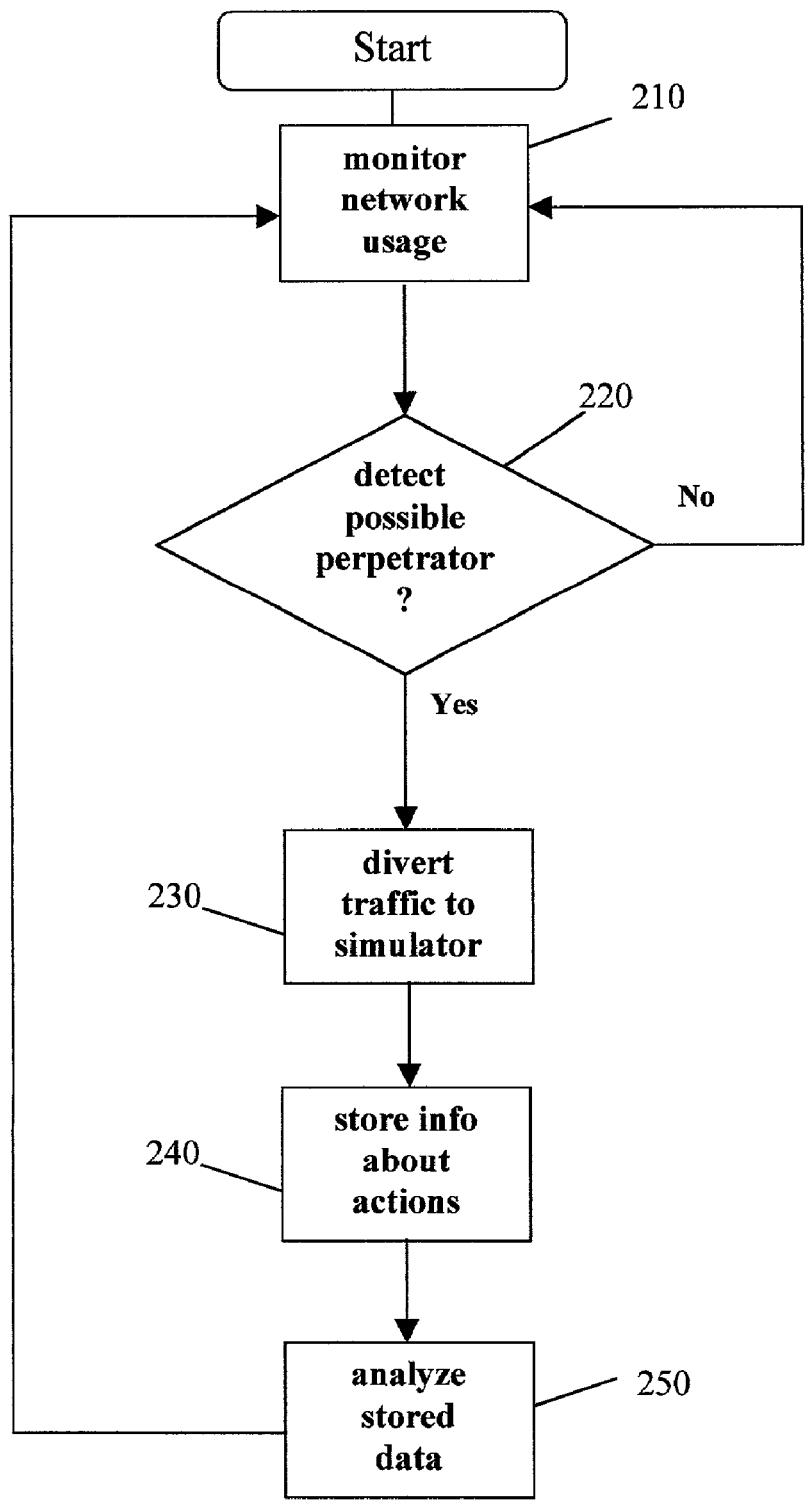
FIG. 2 illustrates the operation of an embodiment of the method for security management using vicarious network devices of the present invention.

The operation of an embodiment of the present invention is illustrated in FIG. 2. As shown in FIG. 2, network usage is monitored 210 for evidence of suspicious or otherwise unusual activity. Network usage includes, but is not limited to, actual packets, decoded information within packets, and traffic and packet patterns. Network usage monitoring is considered to include, but to not be limited to, identifying suspicious traffic, watching the behavior of individuals admitted to interaction with the network, computer systems monitoring, application monitoring, and/or general network intelligence gathering. If potential malicious activity is detected 220, the traffic and activities of at least the suspect individual are redirected 230 to the vicarious device. Information about the suspect's activities is then optionally stored 240 in the perpetrator file for either simultaneous or later analysis 250.

In one embodiment of the invention, by way of example, the control agent's monitoring function may be filled by a method or apparatus such as described in U.S. Pat. No. 6,026,442, issued to Cabletron Systems' Aprisma Management Technologies ("Method and Apparatus for Surveillance in Communications Networks"). In U.S. Pat. No. 6,026,442, control of network surveillance in communications networks is accomplished by dividing the surveillance task into two subtasks. The first subtask automatically identifies communications within the network that are to be monitored. Such identification is accomplished by the application of a reasoning system to data received from the network. The identification of the data to be monitored is received by the second subtask, along with network topology information. The second subtask also applies a reasoning system to this data in order to configure probes and switches within the network so that the identified data can be captured.

One type of monitoring known in the art that may be utilized by an embodiment of the control agent of the invention is traffic volume monitoring. In traffic volume monitoring, the monitor looks for too much traffic to a particular destination. If detected, the monitor then looks particularly for traffic to that destination coming across the network's border routers (e.g. access routers, peers, exchange points).

Ideally, such tools are automated. In one example described in the art, too many queue drops on an access router automatically triggers source detection.

In an alternate type of monitoring that may be utilized by an embodiment of the control agent of the present invention, one or more parameters identified as "Intruder Detection" parameters are monitored. Such parameters may include, but are not limited to:

Login failures
Access list violations (MAC address)
Access list violations (Network address)
Message origin (outside a trusted domain)
Setting in a device outside of domain policy
Time-of-day violation for settings
DOS RTM delay thresholds being exceeded In one embodiment, this type of monitoring is performed by an enterprise management station. An enterprise management station utilized for monitoring in this manner will possibly need to employ very sophisticated techniques so, while possible, it may be somewhat unlikely that there will be a station actually residing in each network device, or even in any single network device. It might therefore be difficult to have simulators for all monitored network devices available at all times. In such circumstances, a limited redirect function and a limited set of devices (like a single workstation) for all simulations might be employed.

A device simulator suitable for use in an embodiment of the present invention is described in U.S. Pat. No. 5,907,696, issued to Cabletron Systems' Aprisma Management Technologies ("Network Device Simulation"). U.S. Pat. No. 5,907,696. describes a method and apparatus for creating the appearance of a network device and its communications. In U.S. Pat. No. 5,907,696, a device dataset contains a plurality of counter variables having instance values that change over time and describe the behavior of the device on the network. A characterization file is created from the device dataset based on correlations among the variables and their instance values. The characterization file is then used to generate predicted instance values for a simulated device.

An example embodiment of the present invention therefore might utilize a simulated device that operates as described in U.S. Pat. No. 5,907,696, as well as a real device doing actual work. In this embodiment, when there is suspicion that the real device is being tampered with, the simulated device is put in its place, unbeknownst to the perpetrator. The transactions of the perpetrator are then logged into the perpetrator file according to methods described in U.S. Pat. No. 5,907,696. Analysis of the file may then provide information regarding the identity and methods of the perpetrator. Additionally, trends in multiple suspicious incidents may be identified and used to trigger recognition of future suspicious incidents. Furthermore, security weaknesses of the real device may be exposed.

In one particular example embodiment, a device according to U.S. Pat. No. 5,907,696. (the Aprisma Management Technologies SPECTRUM™ Agent Simulator) is utilized for simulation of an SNMP agent and its SNMP communications. However, although the simulator employed in this example embodiment is SNMP, it is important to understand that the concepts of the present invention can be applied to any other network or network device simulation, even those that are non-SNMP-based. The Aprisma Management Technologies SPECTRUM™ Agent Simulator represents an integration of several technologies for the purpose of simulating SNMP networking devices. This is accomplished by first capturing the device information by a process called cloning. The device information is then written to a database that contains the device's data components. Once captured, the device information can be replayed at a later time in the form of an SNMP Agent Simulation.

The SPECTRUM™ Agent Simulator is easily integrated with the SPECTRUM™ Enterprise Management System. In one embodiment of the present invention, therefore, the control agent function may be performed by the SPECTRUM™ Enterprise Management System and the vicarious device function may be filled by the SPECTRUM™ Agent Simulator. However, while the described embodiment particularly allows integration with SPECTRUM™, it does not preclude integration with other network management system platforms. Currently, SPECTRUM™ does present an improvement over other network management system platforms because of its ability to represent the topological relationships between device models.

Figure 3:
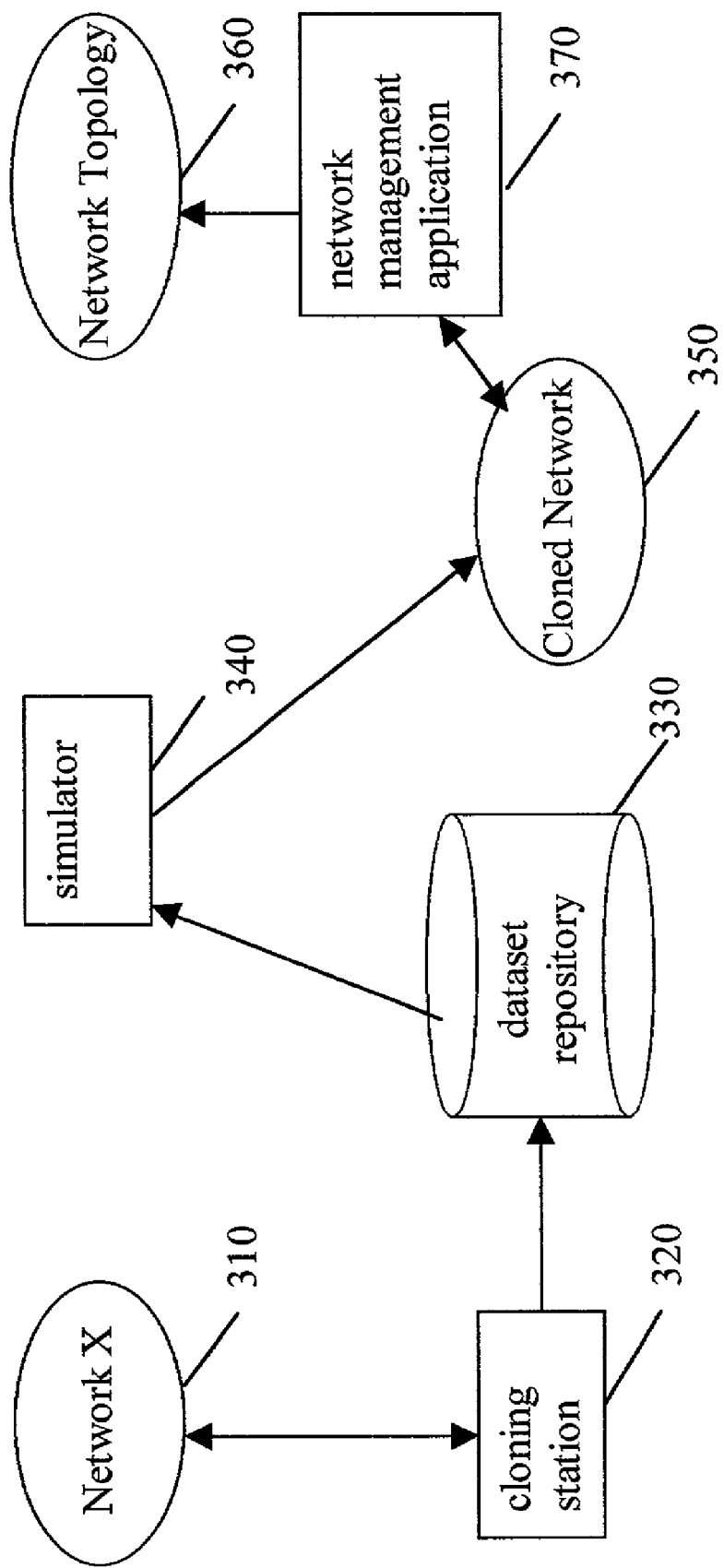
FIG. 3 is a block diagram illustrating an example embodiment of a process for developing a simulator for a specific device or network for use in the present invention.

The process of developing a simulator for a specific device or network using the techniques of U.S. Pat. No. 5,907,696. may be better understood by reference to FIG. 3. As shown in FIG. 3, specific information produced by, or related to the functioning of, a transmission medium or network device 310 is captured by a cloning station 320. In the example embodiment, the cloning station 320 would capture SNMP protocols from an SNMP agent. The information captured is then stored in a data set repository 330 until requested by the simulator 340. When the simulated device or transmission medium is needed, such as when malicious activity is detected on the real device or transmission medium, the simulator 340 requests the stored data from the data set repository 330 and uses it to produce a cloned simulation 350 of the original transmission medium or device. In a preferred embodiment, the topology 360 of the cloned simulation 350 is both viewable and manageable by a network management application 370, just as if the simulated device or network 350 were a real device or network.

The SPECTRUM™ Simulator project has had significant success in producing viable simulations of complex networking devices. These simulated devices are already utilized for other types of tasks, such as automated testing, rapid prototyping, training, and fault reproduction. These emerging tools have delivered reduced costs in equipping network labs while providing greater control over device functionality and behavior. In order to consistently effectively simulate network and network device responses in real-time, however, further enhancement of the simulation tools to increase their capacity and performance might sometimes be useful. Ideally, it should be possible to run relatively large network simulations on modest hardware such as notebook computers.

As much as the full SPECTRUM™ Simulator has been successful, its use has occasionally been limited to simulating relatively small networks or executing on very large compute engines. In particular, the startup of full simulations may require significant CPU and memory resources. For example, full simulation of Cabletron SecureFAST devices requires over 10. MBytes of virtual memory per device. Simulating networks of 100. switches requires over 1. Gigabyte of RAM. For acceptable performance, most simulations need to reside in main memory; otherwise, excessive paging may decrease response time past the point where network management systems time out. In addition to the RAM requirements, the CPU requirements of the SPECTRUM™ Simulator may be significant. When simulations of large networks are required, the startup times may conceivably be long enough to limit the use of such a simulation device for network protection purposes.

As discussed previously, the SPECTRUM™ simulation tool has the ability to accurately clone devices and replay the datasets at a future time. This functionality is a major step forward in simulation technology. However, the drawback of the current implementation is that it uses an approach that may require a great deal of memory and CPU resources because every MIB object instance of the original device is simulated. Since some SecureFAST devices, for example, have over 40,000. unique instances to be simulated, a large number of resources are consequently required. In reality, however, network management systems (such as, for example, SPECTRUM™, VLAN Manager, SPEL) look at only a small portion of the total attributes and instances. In addition, the most common network management operations use an even smaller percentage of the total number of attributes. Therefore, the current simulator utilizes many resources to simulate attributes that will seldom or never be used by network management systems. Similarly, the interactions that a user, even a malicious one, will have with a network or device will typically employ only a very small subset of the total possible device attributes.

Therefore, in order to solve the problems described above and consequently consistently permit efficient network device simulation in real-time, a performance improvement over the invention of U.S. Pat. No. 5,907,696. may be desired. This improvement is obtained by reducing the size of the characterization file by removing the variables in the file that aren't touched or used by the simulator when running under the expected operating conditions. This takes advantage of the fact that, when performing simulations, details are commonly included in the simulation that are not actually necessary to perform the required tasks. These unnecessary details (for example, MIB objects) consume significant computer resources (such as memory and CPU time to create the relevant instances), resulting in potential underachieving simulation performance. This improvement therefore utilizes data reduction in order to obtain improved simulation performance.

Since a large percentage of the attributes currently being simulated are not typically used by either network management systems or users, this data can be compressed or eliminated without significant loss to the overall utility of the simulation. This is analogous to the reason why having only a small amount of cache memory offers a significant performance improvement for most software applications: because a small number of memory locations are typically referenced much more frequently than all of the others. The key step to this improvement is therefore identifying the unused attributes and instances and then removing them from the dataset, thereby producing a "SimLite" dataset.

It is worth noting that the SimLite dataset does not have all the data of the original and that its usefulness will therefore be limited to the original tasks for which it is prepared. For example, if the SimLite dataset is identified during device discovery and alarm management operations, then the dataset will contain only the attributes required for those purposes. It is important, therefore, that the information dataset collected for simulation of a specific device or network be collected while the device or network is experiencing the conditions that would lead the network monitor to suspect that the network or device is under attack. This is easily accomplished by simulating various types of likely attacks on the network or device during the collection process.

In a preferred embodiment, the process of reducing attributes and instances in the simulation datasets is automated. While a SimLite dataset may be produced by hand-editing the dataset, this process can take a long time and may be error-prone, with some unnecessary attributes possibly being missed and some necessary ones being inadvertently deleted. The automated process therefore runs the simulation under actual operating conditions in order to identify which attributes are commonly used by an application to perform the required tasks. All activity by the simulator is logged, and this log is then used to identify necessary attributes. All unused attributes are then deleted from the dataset. In one experiment, a dataset with 11,200. original attributes was reduced to around 400 attributes. The performance and capacity improvements of SimLite are therefore primarily due to this dataset reduction process.

Figure 4:
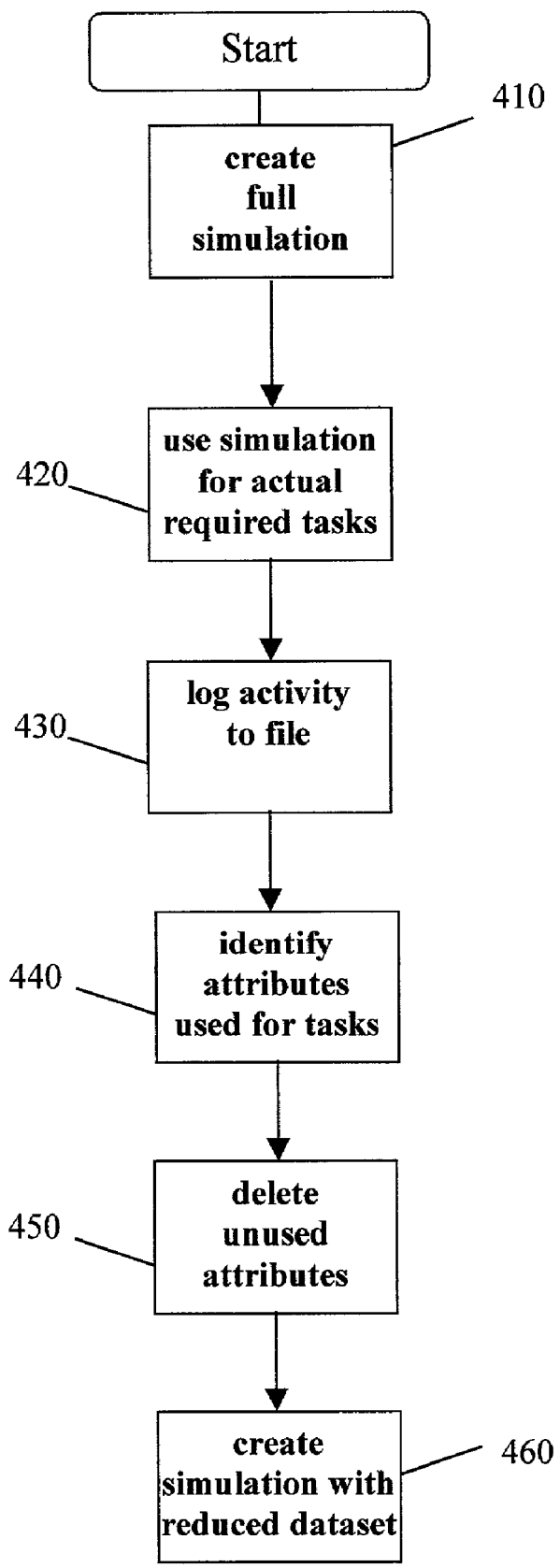
FIG. 4 illustrates an embodiment of a method of producing a reduced dataset for use in creating a simulated device that can effectively provide convincing real-time responses for use in an embodiment of the apparatus of the present invention.

FIG. 4 illustrates an embodiment of the method of producing a reduced dataset for use in the creation of a simulated device that can effectively provide convincing real-time responses for use in the apparatus of the present invention. As shown in FIG. 4, a full simulation of the device or network is created 410. The simulated device or network is then run 420 under actual operating conditions and asked to perform the tasks it will likely be expected to perform when under attack. Essentially, an attack is simulated upon the simulator. The simulator's activity under these conditions is logged 430 to a file, which is then used to identify 440 those attributes that are actually used in the performance of the required tasks. Unused attributes are then deleted 450 from the simulator dataset, and a new simulator is created 460 utilizing only the reduced dataset.

An example embodiment of an automated SimLite algorithm, utilizing the SPECTRUM™ Agent Simulator, follows:

1. Create a topology database (using maketdb.exe) with two devices of the target dataset to be processed.

2. Start one intelligent agent (fill version) by hand, using the following command: snmpsimcf-ilP_. Address-dDataSet-m1-rvlan.clp-iFilterIP-fDataSet.log.

3. Start the other intelligent agent, snmpsimc (either full or SimLite version), at the other IP address assigned by maketdb.

4. In this example, the FilterIP is the IP address of the machine running topint.exe and VLAN Manager. If these are not on the same machine, then a "partial" IP Address is used. For example, if topint is running on 192.168.1.1. and VLAN Manager is running on 192.168.1.2, then the FilterIP is 192.168.1. All packets coming from hosts that match the filter will be captured in this log file. If both clients are neither on the same machine nor on the same network, then the logs must be produced separately and concatenated.

5. Once both agents are executing, start topint.exe and enter the name of the topology database created in step 1.. The default value is topo.mdb. From this point, uncheck the "Start Simulations" and "Wait for Simulations" boxes. Check the box "Exit When Done". Then press Go. This step applies the VLAN configuration data to the running simulations.

6. After the topint exits, go to VLAN Manager and enter the IP Address of one of the simulations as the seed switch to perform a discovery. It does not matter which simulation is chosen. In the discovery control panel, make sure "Enable Polling" is checked and set the polling interval to 60. seconds. Begin discovery and wait for it to complete; this should take a few minutes. Once this is finished, wait two more minutes (or two poll cycles), and then kill the SNMP agents. At this point, the log file, DataSet.log, has been produced and contains a list of all the OIDs that have been used during the configuration and discovery of the simulations.

7. Copy the file DataSet.log and DataSet.mdb to the same directory as SimLite.exe.

8. Execute the main SimLite process by invoking SinLite-.exe. Enter the name of the log file, DataSet.log, and the dataset to be processed, and select the box "PreProcess Log File". A copy of the original dataset and the log file must be in the same directory where SimLite is being run. Once the data is entered, press "Start" to begin processing. The phases of the process are reflected in the box above the Start button. The whole process may take several minutes, depending on machine performance and dataset size.

9. Once this completes, a SimLite version of the original dataset is created in the directory where this has been run. For example, if there was a dataset named 9E423-36. whose corresponding file was d:\simulate\db\9E423-36.mdb, a new dataset, 9E423-361, is created and whose corresponding file is d:\simulate\db\9E423-361.mdb.

The following table contains a comparison of the full simulation and SimLite. The test conditions were the startup of 12. SecureFAST simulations connected in a full mesh topology with three VLANs and two users per switch. These tests were executed on a 200. MHz Pentium Pro with 128M RAM.

|  | Full Simulation | SimLite | % Improvement |
|---|---|---|---|
| Startup Time | 9:15.0 | 0:10.7 | 98 |
| Virtual Memory (/agent) | 7576K | 1720K | 77 |
| Total Memory | 98.012 M | 22.800 M | 77 |

As shown in the table, there was a 98% improvement in startup time. The agents started up nearly 52. times faster than the original simulation. The improvements in memory efficiency were also significant: 77% represents a system improvement of 4.4. times, i.e. the full simulation required 4.4. times as much memory. In addition, further improvements in memory utilization may be obtained through CLIPS DLL development, SNMP DLL development, database optimization techniques, compile level optimizations, improved memory allocation algorithms, and code and algorithm optimizations.

Another test was performed at much higher capacity in order to analyze the "high end" of SimLite when operating on then-current machines. In this test, 200. SecureFAST switches connected in a ring topology with 20. users per switch were simulated. This test was conducted on a 200. MHz Pentium Pro with 512M RAM. This test was not possible with the full simulation, so only performance of the SimLite system is published.

| Startup Time | 7:03 |
|---|---|
| Total Memory | 768.6 M |

As shown by this test, a simulation of 200. complex devices is possible with a reasonable amount of additional RAM. These tests demonstrate the possibilities of SimLite when applied to both low- and high-end network simulation. Given the current state of SimLite, it is possible to run multiple device simulations on a high-end notebook computer.

The SimLite embodiment therefore significantly reduces the time and complexity associated with simulation of network devices. The application of data reduction techniques to network management simulations provides for substantial improvements in performance and capacity. This approach derives its benefits from the application of the heuristic that, for example, only a small percentage of the variables in an SNMP compliant device's MIB are used by most network management operations. Since only a small percentage are actually used, the remainder of the variables are therefore determined to be unnecessary and are removed from the dataset.

In the SimLite embodiment, a runtime-based analysis is used to identify the necessary variables from the entire variable list. In the particular embodiment described above, data sent by the network management system is captured directly. SimLite then works by eliminating all data from the simulation except that which was seen and captured from the network management system. In this embodiment, the agent has a data capture facility that writes all requests and responses to a file. An alternate method by which data may be captured is to capture all network management packets with a network analyzer and save the data to a file. The specific variables and instances utilized can then be extracted from this file and the required data reduction subsequently performed.

While the foregoing examples describe a specific process used to capture the variables used by a simulated device under the expected operating conditions and to retain only those variables for use, the other ways to capture and retain this information that are known in the art are considered to be within the scope of the present invention. The major new aspects are therefore the removing of unused variables from the simulation and the approach of performing run-time analysis on the simulated device traffic.

The increased capacity and performance of the SimLite model opens several potential new uses of this resource. This includes, but is not limited to, "Network in a Box" sales tools, wherein a customer performs a test drive of network management products against a simulated network running on a notebook computer, and entire network simulation capability, opening the possibly of testing network management products against simulations of very large customer networks without requiring the actual network. Capacity improvements may make it possible to simulate nearly every SNMP device on a customer network. Other possibilities are Operator Training Environment, making it possible to train network management operators with a replica of their network using high performance simulation tools, and Inter-Company demos. For example, for a global enterprise, a company in one country might want to demo its management techniques to another company in another country. Their entire network could be simulated and transported in a laptop computer. Further uses might be to test new versions of a network management system on a simulated network before installing it on a production system, as well as using simulations to design, test, and evaluate complex event correlation scenarios.

Depending on the sophistication of the simulator employed, a potential difficulty may be that the simulator may lack certain "realness" in its responses, since it is not the actual forwarding device. This could potentially allow an intruder of greater sophistication to determine that he is actually being "spoofed" and/or monitored. An embodiment of the present invention solves this potential difficulty by having the simulator query the actual networking device for exact values, in order to permit a more reliable portrayal of the device. The simulator then blends the real device data with simulated responses. For example, a port that was disabled by the intruder could be shown to have counters that did not increment from the last "real" value obtained from the actual device.

Figure 5:
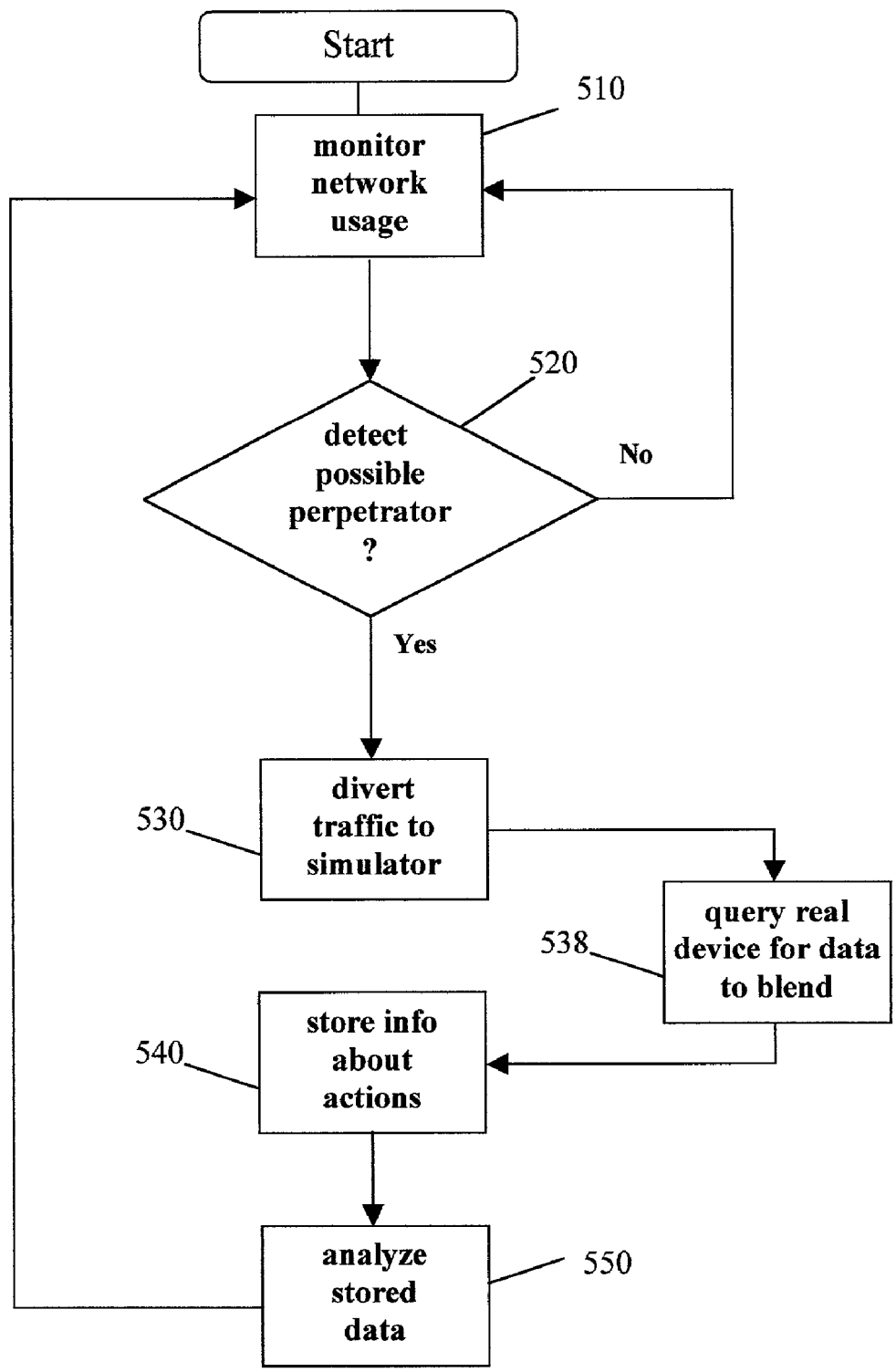
FIG. 5 illustrates the operation of an embodiment of the present invention wherein the vicarious device queries the real device for real values and responses to be sent to the suspect individual.

An illustration of the operation of an embodiment of the present invention, wherein the simulator queries the real device for real values and responses to be sent to the suspect individual, is shown in FIG. 5. In FIG. 5, network usage is monitored 510 for evidence of malicious activity. If potential malicious activity is detected 520, traffic is redirected 530 to the simulated device. The simulator may query 538 the real device for actual device values, which are then either sent directly to the suspect or are blended with simulated values and responses. Information about the suspicious activities is optionally stored 540 in the perpetrator file for either simultaneous or later analysis 550.

If the period while the vicarious device is substituted for the actual network device is reasonably small, traffic received while the vicarious device is in effect may be preserved through buffering. It is generally desirable to do this, not only to prevent loss of data for non-attackers, but also to prevent the attacker from detecting the simulation. If data is discarded, the attacker may detect this and leave before being identified. An illustration of the operation of an embodiment of the present invention that utilizes traffic buffering is depicted in FIG. 6.

Figure 6:
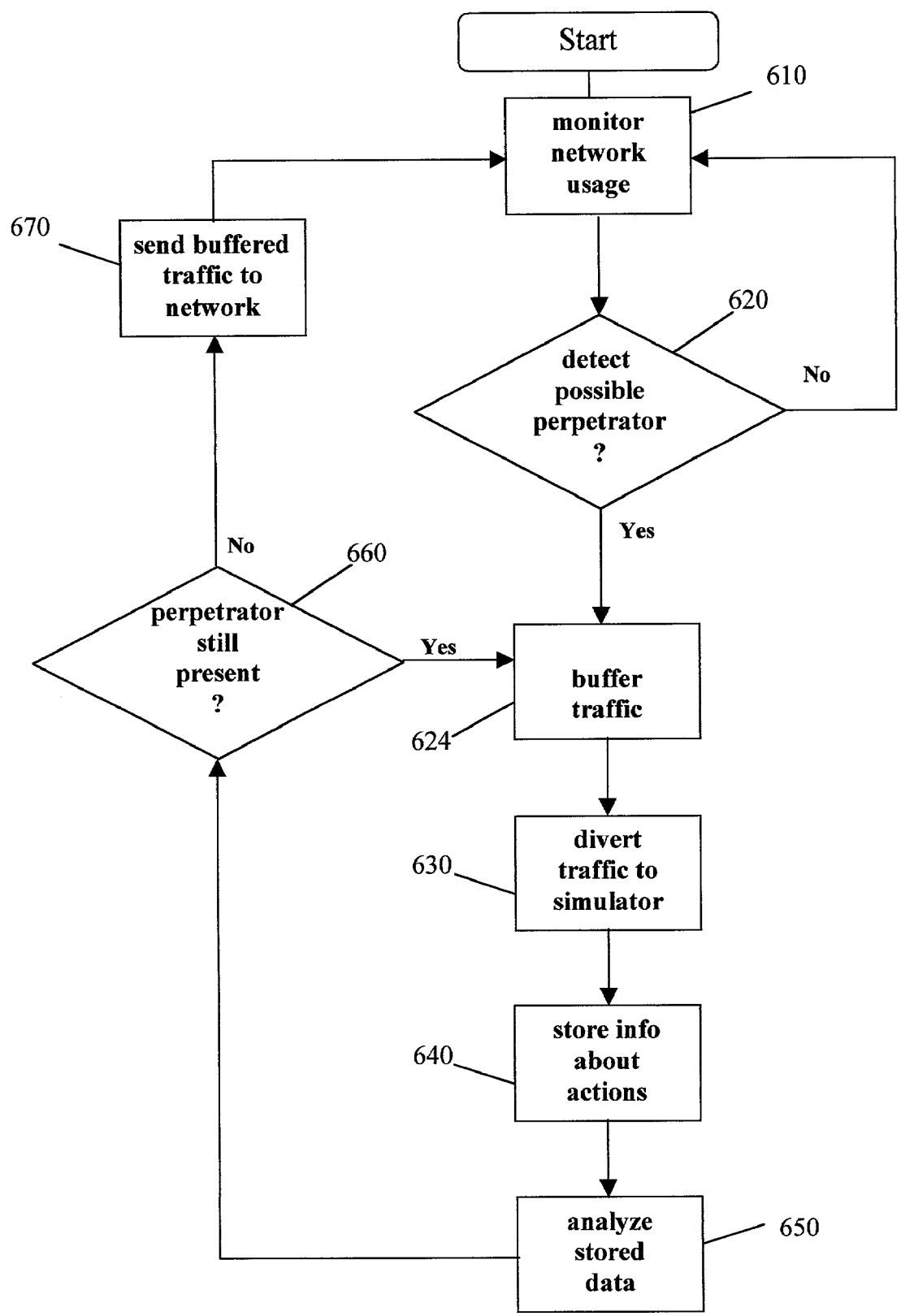
FIG. 6 illustrates the operation of an embodiment of the present invention utilizing traffic buffering.

As shown in FIG. 6, network usage is monitored 610 for evidence of malicious activity. If potential malicious activity is detected 620, all incoming traffic is buffered 624. The traffic is then redirected 630 to the vicarious device and information about the suspicious activities is optionally stored 640 in the perpetrator file for either simultaneous or later analysis 650. Traffic continues to be buffered 624 until the suspicious traffic and activities have halted 660, at which time the buffered traffic is sent 670 to the real network device. Preferably, those activities deemed suspicious will be disabled prior to sending the buffered traffic to the real network.

Obviously, the previous embodiment is mainly useful when the period of malicious activity is fairly short. While replacing the network device which is under attack with a simulated copy lets event monitoring take place without the intruder interfering with normal network operation, there is a natural concern that, by taking the actual device offline, there may be complete denial of service (DOS) to ordinary users while the simulated device is operational. While it is possible for some devices (e.g. end stations or very simple network devices) to be simulated without full, or perhaps any, DOS, alternate embodiments of the present invention have been developed to address situations where prolonged malicious activity might lead to DOS for ordinary users.

The present invention therefore contemplates alternate constructions that avoid a potential DOS problem. In one such alternate embodiment, a mechanism (such as, for example, a software or hardware filter/redirector) may be added to existing network devices in order to redirect only specific messages or categories of messages to a simulator. Examples of the many possible categories known in the art include, but are not limited to, internal, in-band, or out-of-band. This allows provision of responses without taking the primary forwarding device offline. An embodiment of the method of the invention employing this approach is depicted in FIG. 7.

Figure 7:
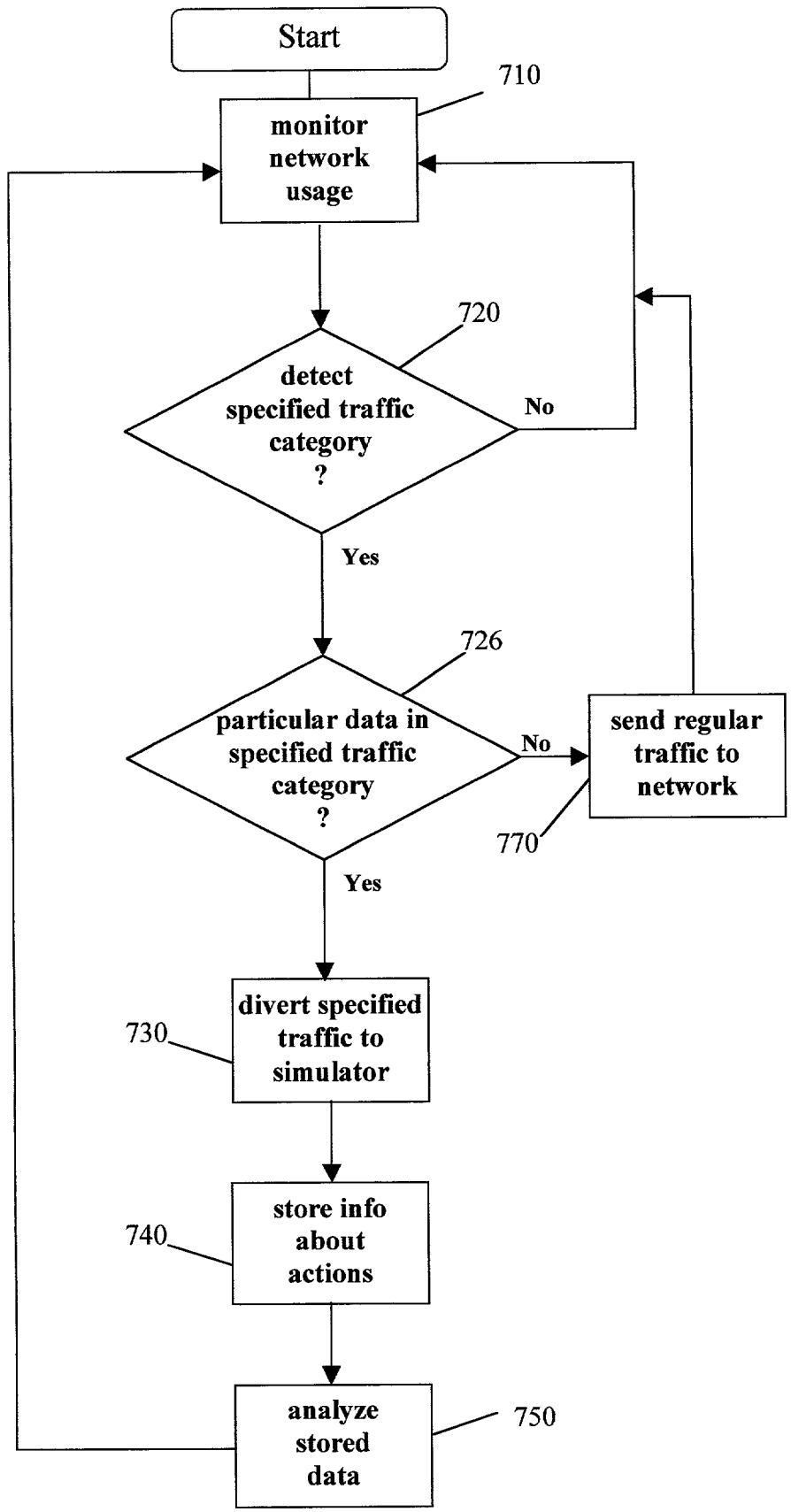
FIG. 7 illustrates an embodiment of the present invention wherein only specific messages or categories of messages are redirected to the vicarious device.

As shown in FIG. 7, network usage is monitored 710 for specified categories of traffic, presumptively those categories that may be evidence of malicious activity. If a specified category of traffic is detected 720, data and actions in that category of traffic 726 are then redirected 730 to the simulated device and information about that traffic is stored 740 in the perpetrator file for either simultaneous or later analysis 750. Normal traffic during this time is still sent directly 770 to the real network.

Depending on the nature of the attack, an alternate embodiment allows the simulator to send "Action" commands back to the actual device. Examples of such commands include, but are not limited to:

Enable an existing "Filter" for the attacker messages
Institute a new "Filter" for the attacker messages
Disable an affected input port(s)
Disable an affected output port(s)
Disable the partial or complete forwarding through the device
Disable the management agent(s) of the actual device (in order to prevent other attacks)
Purge the management agent of recent command settings (time-based on number or type commands)
Restore the device to a known "good" setting base (restore all settings as they were last midnight).
Trace commands These action commands may come to the actual device directly from the simulator or may come from a "trusted" management station or other device that receives output from the simulator. If present, the management device may also receive other inputs from other network devices or simulators that may be used to set intruder traps, set up filters, or to determine/limit the extent of the actions or attacks. An embodiment of the present invention wherein the vicarious device may send commands back to the actual device is depicted in FIG. 8.

Figure 8:
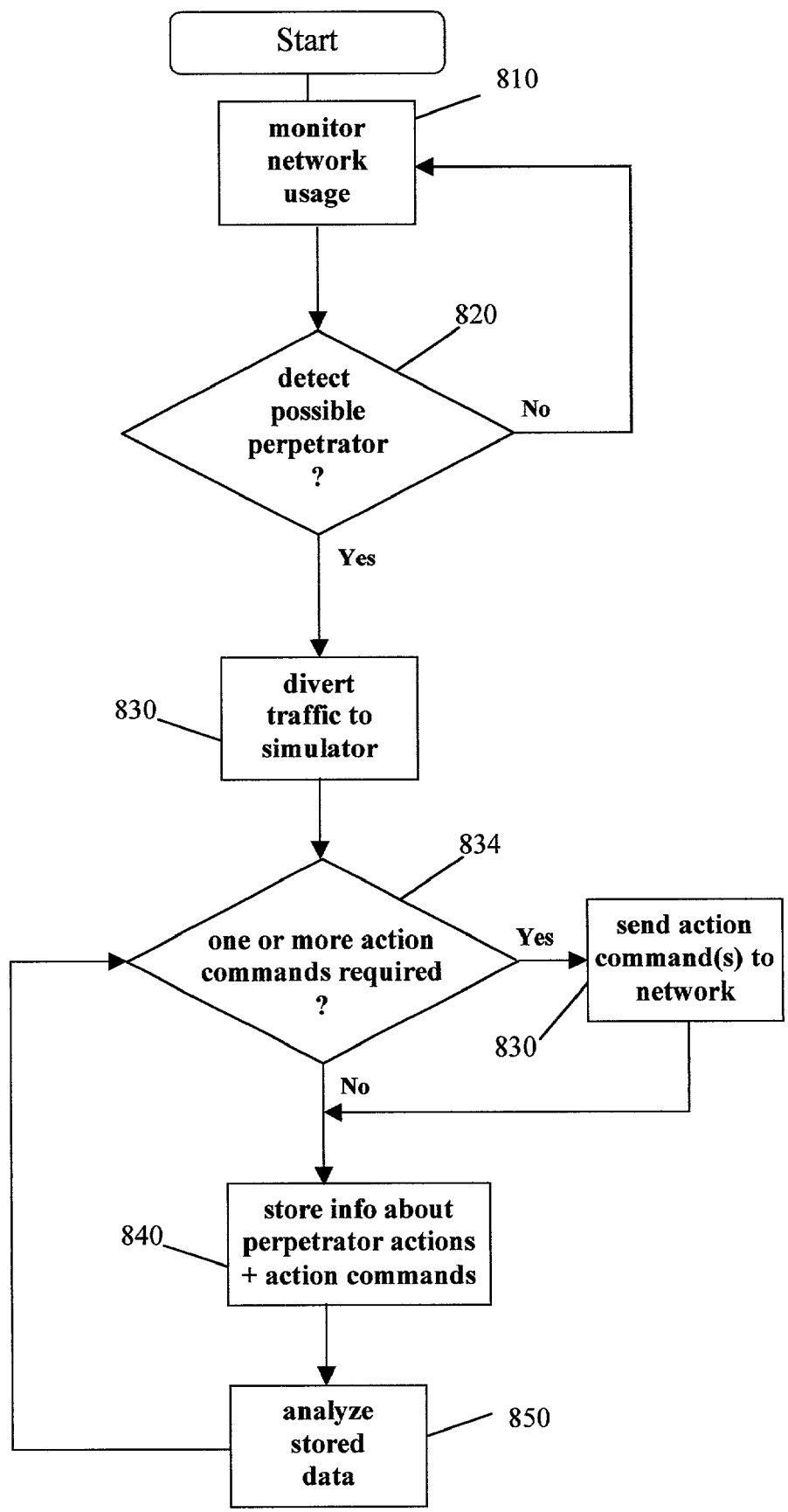
FIG. 8 illustrates an embodiment of the present invention wherein the vicarious device is able to send commands back to the real network or device.

As shown in FIG. 8, network usage is monitored 810 for evidence of malicious activity. If potential malicious activity is detected 820, the traffic and activities of at least the suspect individual are redirected 830 to the simulated device. If one or more actions 834 are required by the network in response to the suspect's activities, one or more action commands are sent 836 to the network. Information about the suspect's activities and any action commands sent is then stored 840 in the file for either simultaneous or later analysis 850.

The apparatus and method of the present invention, therefore, provide protection for data, voice, and video networks by substituting a vicarious device or transmission medium for a real network device or transmission medium that has become the focus of malicious activity. Each of the various embodiments described above may be combined with other described embodiments in order to provide multiple features. For example, while the simulated device is in effect, the method and apparatus of the present invention contemplate various methods and combinations of methods for handling the normal traffic on the device or network. Any of these methods may be used in combination with, for example, the ability to send action commands to the network, and/or with the ability to query the actual network device for real device values and/or responses.

Furthermore, while the foregoing describes a number of separate embodiments of the apparatus and method of the present invention, what has been described herein is merely illustrative of the application of the principles of the present invention. Other arrangements, methods, modifications and substitutions by one of ordinary skill in the art are also considered to be within the scope of the present invention, which is not to be limited except by the claims that follow.

What is claimed is:

1. An apparatus for security management in a data, voice, or video network comprising, in combination:
at least one vicarious device capable of automatically simulating at least one corresponding real device or transmission medium in said network, wherein said at least one vicarious device is derived from a device dataset containing one or more variables having one or more instance values describing the behavior of said corresponding real device or transmission medium over time, wherein said device dataset contains only those variables and instance values actually used when said corresponding real device or transmission medium is under attack;

at least one monitor for detecting when said network may be being attacked; and at least one trigger for substituting at least one of said vicarious devices for said corresponding real device or transmission medium.

2. The apparatus of claim 1, wherein said monitor and said trigger are part of a control agent.

3. The apparatus of claim 1, wherein said at least one vicarious device stores at least some received data into a perpetrator file.

4. The apparatus of claim 3, further comprising an analysis agent for analyzing said stored data.

5. The apparatus of claim 4, wherein said analysis agent looks for information useful in determining one or more sources of the attack.

6. The apparatus of claim 4, wherein said analysis agent looks for information useful in determining one or mechanisms used in the attack.

7. The apparatus of claim 1, wherein all traffic to said corresponding real device or transmission medium is diverted to said vicarious device.

8. The apparatus of claim 7, further comprising a buffer to retain said traffic while said at least one vicarious device is in operation and wherein said buffered traffic is sent from said buffer to said corresponding real device or transmission medium when said corresponding real device or transmission medium is returned to operation.

9. The apparatus of claim 7, further comprising a mechanism to signal upstream devices to re-send said traffic when said corresponding real device or transmission medium is returned to operation.

10. The apparatus of claim 1, wherein only suspect traffic is diverted to said at least one vicarious device.

11. The apparatus of claim 10, wherein suspect traffic is further defined as traffic falling into one or more specific traffic categories.

12. The apparatus of claim 1, wherein said at least one vicarious device is derived from, in combination:

the device dataset; and a characterization file created from said device dataset based on correlations among said variables and said instance values and used to generate one or more predicted instance values for said at least one vicarious device.

13. The apparatus of claim 1, wherein said at least one vicarious device and said corresponding real device or transmission medium are integrated with a management system.

14. The apparatus of claim 1, wherein said at least one vicarious device queries said corresponding real device or transmission medium for at least one actual device value or response for use in providing at least one value or response from said at least one vicarious device.

15. The apparatus of claim 1, wherein at least one command is sent to said corresponding real device or transmission medium from said at least one vicarious device.

16. The apparatus of claim 15, further comprising a trusted device that relays said at least one command from said at least one vicarious device to said corresponding real device or transmission medium.

17. A method for security management in a data, voice, or video network comprising the steps, in combination, of:

detecting when said network is being attacked; and substituting at least one vicarious device for at least one corresponding real device in said network, the at least one vicarious device automatically simulating said at least one corresponding real device in said network, wherein said at least one vicarious device is derived from a device dataset containing one or more variables having one or more instance values describing the behavior of said corresponding real device or transmission medium over time, wherein said device dataset contains only those variables and instance values actually used when said corresponding real device or transmission medium is under attack.

18. The method of claim 17, further comprising the step of storing at least some data received by said at least one vicarious device.

19. The method of claim 18, further comprising the step of examining said stored data.

20. The method of claim 19, wherein said stored data is analyzed for information useful in identifying at least one source for the attack.

21. The method of claim 19, wherein said stored data is analyzed for information useful in identifying at least one mechanism used in the attack.

22. The apparatus of claim 17, wherein all traffic to said at least one corresponding real device is diverted to said at least one vicarious device.

23. The apparatus of claim 22, further comprising the steps, in combination, of:

buffering said traffic while said at least one vicarious device is in operation; and sending said buffered traffic to said corresponding real device or transmission medium when said corresponding real device or transmission medium is returned to operation.

24. The apparatus of claim 22, further comprising the step of signaling upstream devices to re-send said traffic when said corresponding real device or transmission medium is returned to operation.

25. The apparatus of claim 17, wherein only suspect traffic is diverted to said at least one vicarious device.

26. The apparatus of claim 25, further comprising the step of defining suspect traffic as traffic falling into at least one specific traffic category.

27. The apparatus of claim 17, further comprising the step of integrating said at least one vicarious device and said corresponding real device or transmission medium with a management system.

28. The apparatus of claim 17, further comprising the steps, in combination, of:

sending at least one query from said simulated device to said corresponding real device or transmission medium to obtain at least one actual device value or response; and using at least one of said actual device values or responses to provide at least one value or response from said at least one vicarious device.

29. The apparatus of claim 17, further comprising the step of sending at least one command from said at least one vicarious device to said corresponding real device or transmission medium.

30. The apparatus of claim 29, further comprising the step of relaying said at least one command via a trusted device.

31. A method for creating a simulator suitable for use in network security management comprising the steps, in combination, of:

creating a full simulated version of a real device, said simulated device having a dataset containing data values corresponding to attributes of the real device;

running the simulated device under simulated attack conditions;

capturing the simulated device's activity;
determining which attributes were used;
eliminating data values corresponding to unused attributes from the simulated device dataset to create a reduced dataset containing only data values corresponding to used attributes; and
creating a new simulated device having the reduced dataset.

32. The method of claim 31, wherein said step of capturing is performed by a management system.

33. The method of claim 31, wherein said step of capturing is performed by capturing management packets with a network analyzer.

* * * * *